US010937250B2

(12) United States Patent
Xie et al.

(10) Patent No.: US 10,937,250 B2
(45) Date of Patent: Mar. 2, 2021

(54) METHODS OF RECONSTRUCTING SKULLS

(71) Applicant: National University of Singapore, Singapore (SG)

(72) Inventors: Shudong Xie, Singapore (SG); Wee Kheng Leow, Singapore (SG); Thiam Chye Lim, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 16/466,461

(22) PCT Filed: Dec. 5, 2017

(86) PCT No.: PCT/SG2017/050595
§ 371 (c)(1),
(2) Date: Jun. 4, 2019

(87) PCT Pub. No.: WO2018/106182
PCT Pub. Date: Jun. 14, 2018

(65) Prior Publication Data
US 2019/0355183 A1 Nov. 21, 2019

(30) Foreign Application Priority Data

Dec. 6, 2016 (SG) .......................... 10201610236W

(51) Int. Cl.
*G06T 19/20* (2011.01)
*G06T 7/00* (2017.01)
*G06T 17/20* (2006.01)

(52) U.S. Cl.
CPC ............ *G06T 19/20* (2013.01); *G06T 7/0012* (2013.01); *G06T 17/20* (2013.01);
(Continued)

(58) Field of Classification Search
CPC ....... G06T 19/20; G06T 7/0012; G06T 17/20; G06T 2207/10072; G06T 2207/20112; G06T 2207/30008; G06T 2219/2021
See application file for complete search history.

(56) References Cited

U.S. PATENT DOCUMENTS 7,953,260 B2    5/2011   Weinzweig et al.
8,382,765 B2    2/2013   Axelson et al.
(Continued)

FOREIGN PATENT DOCUMENTS

CN    101882326 A    11/2010
CN    202036324 U    11/2011
(Continued)

OTHER PUBLICATIONS

Zhang, Kun, Yuan Cheng, and Wee Kheng Leow. "Dense correspondence of skull models by automatic detection of anatomical landmarks." International Conference on Computer Analysis of Images and Patterns. Springer, Berlin, Heidelberg, 2013. (Year: 2013).*

(Continued)

*Primary Examiner* — Yu Chen
(74) *Attorney, Agent, or Firm* — Botos Churchill IP Law LLP

(57) ABSTRACT

A three-dimensional model of a reconstructed bone framework is obtained using an iterative, surface interpolating algorithm. A reference and a target three-dimensional model are provided. The reference model is non-rigidly registered to the target model based upon positional constraints, so as to produce a registered reference model. An initial reconstructed model is set as the registered reference model. A first correspondence search is iteratively conducted to identify a first set of corresponding points on the reconstructed and target models. During each iteration, the reconstructed model is incrementally and non-rigidly registered to the (Continued)

target model based upon the corresponding points. A second correspondence search is conducted to identify a second set of corresponding points on the reconstructed and target models. Crossings in the identified corresponding points are removed and the reconstructed model is non-rigidly registered to the target model, based upon the remaining corresponding points so as to produce a registered, fully reconstructed model. The preferred embodiment is the reconstruction of a skull using Laplacian deformation method with flip-avoiding interpolating surface (FAIS) step.

20 Claims, 15 Drawing Sheets

(52) U.S. Cl.
CPC ............... *G06T 2207/10072* (2013.01); *G06T 2207/20112* (2013.01); *G06T 2207/30008* (2013.01); *G06T 2219/2021* (2013.01)

(56) References Cited

U.S. PATENT DOCUMENTS

| | | | |
|---|---|---|---|
| 8,571,710 | B2 | 10/2013 | Coste-Maniere et al. |
| 2013/0144570 | A1 | 6/2013 | Axelson et al. |
| 2014/0029812 | A1* | 1/2014 | Kriston ................ G06T 7/33 382/128 |
| 2016/0005166 | A1* | 1/2016 | Xu ...................... G06T 11/003 382/128 |

FOREIGN PATENT DOCUMENTS

| | | |
|---|---|---|
| CN | 102551892 A | 7/2012 |
| CN | 103106348 A | 5/2013 |
| CN | 103679816 A | 3/2014 |
| CN | 103942826 A | 7/2014 |
| CN | 104200524 A | 12/2014 |
| EP | 1188421 A2 | 3/2002 |
| EP | 1406203 B1 | 8/2006 |
| WO | 2002069787 A1 | 9/2002 |
| WO | 2008027549 A2 | 3/2008 |
| WO | 2008080235 A1 | 7/2008 |
| WO | 2008138137 A1 | 11/2008 |
| WO | 2010076673 A1 | 7/2010 |
| WO | 2012151393 A2 | 11/2012 |
| WO | 2013129895 A1 | 9/2013 |
| WO | 2015142291 A1 | 9/2015 |

OTHER PUBLICATIONS

Feng, Ding, and Leow Wee Kheng. 3D Segmentation of Soft Tissues by Flipping-free Mesh Deformation. Diss. 2010. (Year: 2010).*
Ding et al., "3D Segmentation of Soft Organs by Flipping-Free Mesh Deformation", 2009 Workshop on Applications of Computer Vision (WACV), Dec. 2009, pp. 1-7.
International Search Report for Application No. PCT/SG2017/050595 dated Feb. 21, 2018.
Rampon, Master dissertation—"Patient Specific Mesh Generation", Mar. 2016, pp. 1-60.
Sorkine, "Laplacian mesh processing", Eurographics 2005—State of the Art Reports, Sep. 2005, pp. 1-18.
Vikas et al., "Application of Laplacian Surface Deformation and selforganizing maps to calculate shape correspondence for statistical shape modelling", 2014 IEEE 11th International Symposium on Biomedical Imaging (/SB/), May 2014, pp. 369-372.
Xie et al., "Flip-Avoiding Interpolating Surface Registration for Skull Reconstruction", 23rd International Conference on Pattern Recognition (/CPR 2016), Dec. 2016, pp. 228-233.

Xie et al., "Laplacian Deformation with Symmetry Constraints for Reconstruction of Defective Skulls", 1 J1h International Conference on Computer Analysis of Images and Patterns (CAIP 2017), Jul. 2017, pp. 24-35.
Benazzi S., Stansfield E., Milani C., Gruppioni G., "Geometric morphometric methods for three-dimensional virtual reconstruction of a fragmented cranium: the case of Angelo Poliziano", Int. J. Legal Medicine, vol. 123, 2009, pp. 333-344.
Bettega G., Payan Y., Mollard B., Boyer A., Raphaël B., Lavallee S., "A simulator for maxillofacial surgery integrating 3D cephalometry and orthodontia", Computer Aided Surgery, vol. 5, No. 3, 2000, pp. 156-165.
Bhandarkar S.M., Chowdhury A.S., Tang Y., Yu J. Tollner E.W., "Surface Matching Algorithms for Computer Aided Reconstructive Plastic Surgery", Proc. IEEE Int. Symp. on Biomedical Imaging: From Nano to Macro, 2004, pp. 740-743.
Bookstein, F.L., "Principal Warps: Thin-Plate Splines and the Decomposition of Deformations", IEEE Transactions on Pattern Analysis and Machine Intelligence, vol. 11, No. 6, Jun. 1989, pp. 567-585.
Cevidanes L. et al., "3D Surgical Simulation", am J Orthod Dentofacial Orthop, vol. 138(3), 2010, pp. 361-371.
Chabanas M., Marecaux C., Chouly F., Boutault F., Payan Y., "Evaluating soft tissue simulation in maxillofacial surgery using preoperative and postoperative CT scans", International Congress Series 1268, 2004, pp. 419-424.
Chabanas M., Marecaux C., Payan Y., Boutault F., "Models for planning and simulation in computer assisted orthognatic surgery", Proc. Int. Conf. on Medical Image Computing and Computer-Assisted Intervention (MICCAI), 2002, pp. 315-322.
Chabanas M., Payan Y., "A 3D Finite Element model of the human face for simulation in plastic and maxilla-facial surgery", TIMC Laboratory, University of Grenoble, France, pp. 1-7, year 2000.
Chapuis J., et al., "A new system for computer-aided preoperative planning and intraoperative navigation during corrective jaw surgery", IEEE Trans. on Information Technology in Biomedicine, vol. 11, No. 3, 2007, pp. 274-287.
Cheng Y., "Computer-aided Craniomaxillofacial Surgery Planning for Fractured Skulls", PhD Thesis, National University of Singapore, 2013.
Cheng Y., Leow W.K., Lim T.C., "Automatic Identification of Frankfurt Plane and Mid-Sagittal Plane of Skill", Proc. IEEE Workshop on Applications of Computer Vision, 2012, pp. 233-238.
Cheng Y., Xie S., Leow W.K., Zhang K., "Plane-Fitting Robust Registration for Complex 3D Models", Proc. CAIP, 2015, pp. 1-10.
Chowdhury A.S., Bhandarkar S.M., Robinson R.W., Yu J.C., "Novel Graph Theoretic Enhancements to ICP-Based Virtual Craniofacial Reconstruction", Proc. IEEE Int. Symp. on Biomedical Imaging: From Nano to Macro, 2007, pp. 1136-1139.
Chowdhury A.S., Bhandarkar S.M., Robinson R.W., Yu J.C., "Virtual Craniofacial Reconstruction from Computed Tomography Image Sequences exhibiting Multiple Fractures", Proc. IEEE Int. Conf. on Image Processing, 2006, pp. 1173-1176.
De Momi E., et al., Automatic extraction of the mid-facial plane for cranio-maxillofacial surgery planning, International journal of oral and maxillofacial surgery, vol. 35, No. 7, 2006, pp. 636-642.
Deng Q., Zhou M., Shui W., Wu Z., Ji Y., Bai R., "A novel skull registration based on global and local deformations for craniofacial reconstruction", Forensic Science International, 208, 2011, pp. 95-102.
Fantini M., de Crescenzio F., Persiani F., Benazzi S., and Gruppioni G., "3D restitution, restoration and prototyping of a medieval damaged skull", Rapid Prototyping Journal, 14(5), 2008, pp. 318-324.
Gassner R., Tuli T., Hächl O., Rudisch A., Ulmer H., "Craniomaxillofacial trauma: a 10-year review of 9543 cases with 21067 injuries", Journal of Cranio-Maxillofacial Surgery, 31(1), 2003, pp. 51-61.
Gladilin E., et al. "Generic approach for biomechanical simulation of typical boundary value problems in cranio-maxillofacial surgery planning", Proc. Int. Conf. on Medical Image Computing and Computer-Assisted Intervention (MICCAI), 2004, pp. 380-388.

(56) References Cited

OTHER PUBLICATIONS

Gladilin E., Zachow S., Deuflhar P., Hege H., "Realistic prediction of individual facial emotion expressions for craniofacial surgery simulations", Proceedings of SPIE, vol. 5029, 2003, pp. 520-527.
Gladilin E., Zachow S., Deuflhar P., Hege H., "Validation of a linear elastic model for soft tissue simulation in craniofacial surgery", Proceedings of SPIE, vol. 4319, 2001, pp. 27-35.
Glombitza G., Evers H., Hassfeld S., Engelmann U., Meinzer H., "Virtual surgery in a tele-radiology framework", IEEE Transactions on Information Technology in Biomedicine, vol. 3, No. 3, Sep. 1999, pp. 186-196.
Gottschalk S., Lin M.C., Manocha D., "OBBTree: A Hierarchical Structure for Rapid Interference Detection", Proc. ACM SIGGRAPH, 1996.
Gumprecht H., Widenka D., Lumenta C., Brainlab vectorvision neuronavigation system: technology and clinica experiences in 131 cases, Neurosurgery, vol. 44 (1), 1999, pp. 97-104.
Gunz P., Mitteroecker P., Bookstein F., Weber G., "Computer Aided Reconstruction of Human Crania", British Archaeological Reports International Series 1227(4), 2004, pp. 92-95.
Horn B., "Closed-form solution of absolute orientation using unit quaternions", J. Opt. Society of America, vol. 4, No. 4, 1987, pp. 629-642.
Hsu W.M., Hughes J.F., Kaufman H., "Direct Manipulation of Free-Form Deformations", Computer Graphics, vol. 26, No. 2, 1992, pp. 177-184.
Inion Ltd, "Patient Information Guide to Inion CMF Surgery", 2006.
Keeve E., Girod S., Augustin A., Biner A., Girod B., "Interactive craniofacial surgery simulation", Department of Oral and Maxillofacial Surgery, University of Erlangen-Nuremberg, 1996.
Keeve E., Girod S., Pheifle P., Girod B., "Anatomy-based facial tissue modeling using the finite element method", Proceedings of Visualization, 1996, pp. 1-10.
Keeve E., Girod S., R. Kikinis, Girod B., Deformable modeling of facial tissue for craniofacial surgery simulation, Computer Aided Surgery, vol. 3, No. 5, 1998, pp. 228-238.
Kerwin T., Shen H.-W., Stredney D., "Enhancing realism of wet surfaces in temporal bone surgical simulation", IRRR Trans. Visualization and Computer Graphics, vol. 15, No. 5, 1999, pp. 747-758.
Koch R., Roth S., Gross M., Zimmermann A., Sailer H., "A framework for facial surgery: simulation", ETH, CS Technical Report No. 326, Institute of Scientific Computing, 1999.
Lapeer R.J.A., Prager R.W., "3D shape recovery of a newborn skull using thin-plate splines", Computerized Medical Imaging and Graphics, vol. 24, 2000, pp. 193-204.
Lee M., Chang C., Lin C., Lo L., Chen Y., "T medical rapid prototyping in custom implant design for craniofacial reconstruction", IEEE Int. Conf. on Systems, Man and Cybernetics, 2003, pp. 2903-2908.
Lüthi M., Albrecht T., Vetter T., "Building Shape Models from Lousy Data", MICCA, LNCS 5762, 2009, pp. 1-8.
Masuda H., Yoshioka Y., Furukawa Y., "Interactive Mesh Deformation Using Equality-Constrained Least Squares", Computers & Graphics, vol. 30(6), 2006, pp. 1-24.
Meyer M., Desbrun M., Schröder P., Barr A.H., "Discrete Differential-Geometry Operators for Triangulated 2-Manifolds", Visualization and Mathematics III, Springer-Verlag, 2002, pp. 1-26.
Mollemans W., Schutyser F., Cleynenbreugel J., Suetens P., "Fast Soft Tissue Deformation with Tetrahedral Mass Spring Model for Maxillofacial Surgery Planning Systems", MICCAI 2004, INCS 3217, 2004, pp. 371-379.
Mollemans W., Schutyser F., Cleynenbreugel J., Suetens P., "Tetrahedral Mass Spring Model for Fast Soft Tissue Deformation", IS4TM, LNCS 2673, 2003, pp. 145-154.
Motsch M., Sorkine O., "On Linear Variation Surface Deformation Methods", IEEE Trans. Visualization and Computer Graphics, vol. 14(1), 2008, pp. 1-17.
Pandy M.G., "Computer Modelling and simulation of human movement", Annual Review of Biomedical Engineering, vol. 3(1), 2001, pp. 245-273.
Phillips J.M., Liu R., Tomasi C., "Outlier Robust ICP for Minimizing Fractional RMSD", Duke University Technical Report: CS-2006-05, 2006.
Rosas A., Bastir M., "Thin-Plate Spline Analysis of Allometry and Sexual Dimorphism in the Human Craniofacial Complex", American Journal of Physical Anthropology, vol. 117, 2002, pp. 236-245.
Rossi M., Ribeiro E., Smith R., "Craniofacial Asymmetry in Development: An Anatomical Study", Angle Orthodontist, vol. 73, No. 4, 2003, pp. 381-385.
San Vicente G., et al., J.T., "Maxillofacial surgery simulation using a mass-spring model derived from continuum and the scaled displacement method", Int. J. Computer Assisted Radiology and Surgery, vol. 4, No. 1, 2009, pp. 89-98.
Schmidt J.G., Berti G., Fingberg J., Cao J., Wollny G., "A finite element based tool chain for the planning and simulation of maxillofacial surgery", European Congress on Computational Methods in Applied Science and Engineering, 2004, pp. 1-17.
Sederberg T.W., "Free-Form Deformation of Solid Geometric Models", ACM SIGGRAPH, vol. 20, No. 4, 1986, pp. 151-160.
Sorkine O., Cohen-Or D., Lipman Y., Alexa M., Rössl C., Seidel H.-P., "Laplacian Surface Editing", Proc. Eurographics, 2004, pp. 1-9.
Teschner M., Girod S., Girod B., "Optimization Approaches for Soft-Tissue Prediction in Craniofacial Surgery Simulation", MICCAI 1999, LNCS 1679, 1999, pp. 1183-1190.
Troulis M.J., Everett P., Seldin B., Kikinis R., Kaban L.B., "Development of a three-dimensional treatment planning system based on computed tomographic data", Int. J. Oral Maxillofacial Surgery, vol. 31, 2002, pp. 349-357.
Turner W.D., Brown R.E.B., Kelliher T.P., Tu P.H., Taister M.A., Miller K.W.P., "A novel method of automated skull registration for forensic facial approximation", Forensic Science International, vol. 154, 2005, pp. 149-158.
Wei L., Yu W., Li M., Li X., "Skull Assembly and Completion using Template-based Surface Matching", Int. Conf. on 3D Imaging, Modeling, Processing, Visualization and Transmission (3DIMPVT), 2011, pp. 1-8.
Woo T.L., "On the asymmetry of the human skull", Biometrika, vol. 22, No. 3/4, 1931, pp. 324-352.
Xia J. et al., "PC-based Virtual Reality Surgical Simulation for Orthognathic Surgery", MICCAI, 2000, pp. 1019-1028.
Xia J., Gateno J., Teichgraeber J.F., "Three-Dimensional Computer-Aided Surgical Simulation for Maxillofacial Surgery", Atlas Oral Maxillofaical Surgery Clinics, vol. 13, 2005, pp. 25-39.
Xia J., Samman B., Wang D., Kot C., Yeung R., Tideman H., "Computer-assisted three-dimensional surgical planning and simulation: 3D virtual osteotomy", Int. J. Oral Maxillofacial Surgery, vol. 29, 2000, pp. 11-17.
Xie S., "Reconstruction of Defective Skulls by non-rigid registration with interpolating surface", National University of Singapore, Aug. 2017, pp. 1-113.
Zachow S., Lamecker H., Elsholtz B., Stiller M., "Reconstruction of mandibular dysplasia using a statistical 3D shape model", Int. Congress Series, 2005, pp. 1-6.
Zhang K., Cheng Y., Leow W.K., "Dense Correspondence of Skull Models by Automatic Detection of Anatomical Landmarks", Computer Analysis of Images and Patterns, Part I, LNCS 8047, 2013, pp. 229-236.

* cited by examiner (x:100, y:100, z:117) HU:14; Slice:(257, 268, 103); (L:128, W:256)

METHODS OF RECONSTRUCTING SKULLS

CROSS REFERENCE TO RELATED APPLICATIONS

The present application is a national phase entry under 35 U.S.C. § 371 of International Application No. PCT/SG2017/050595 filed on Dec. 5, 2017, which claims priority from Singapore Patent Application No. 10201610236W, filed on Dec. 6, 2016, the disclosures of which are hereby incorporated herein by reference.

TECHNICAL FIELD

The present invention relates to a method of reconstructing a bone framework, such as a skull, using non-rigid registration of complex 3D models with flip-avoiding interpolating surface. In particular, although not exclusively, the invention relates to a method of reconstructing skulls for the purposes of one or more of craniomaxillofacial (CMF) surgery planning, forensic investigation and physical anthropological study.

BACKGROUND

Methods of reconstructing a human skull are important in craniomaxillofacial (CMF) surgery planning, forensic investigation and physical anthropological study.

In CMF surgery, a surgeon's task is to operate on a defective (target) skull to restore the patient's normal look. Skull defects may be caused by impact injury (e.g. traffic or work accidents, violence), congenital deformity (i.e. the abnormal development of an infant skull) or tumour growth. Software such as Brainlab® generates the normal shape of that patient's skull, or part of the skull, based upon computed tomography (CT) scan images. During surgery, the surgeon realigns the fractured bones or replaces defective portions with implants, using the generated normal shape as a guide.

Reconstruction of a damaged or decayed skull is used in forensic investigation to assist in identification of a victim, based upon his or her remains. Once a non-defective model of the skull has been produced the forensic investigator can attempt to reconstruct the victim's face by laying skin and muscle "tissue" over the bones of the skull. A reconstructed model of the skull may be produced manually or using software tools. The closer the reconstructed skull is to the normal shape of the victim's skull before injury or death, the more correctly the reconstructed face will identify the victim.

Anthropologists reconstruct the (sometimes fossilised) skulls of hominids in order to understand the differences in skull shapes which characterise different species. Such skulls may be defective as a result of violence, sickness, congenital deformities or erosion. Defective skulls are reconstructed manually or using software tools based upon an identification of the species to which the hominid belongs. In other words, the anthropologist begins from a model of the known, normal skull shape for that species.

In general, there are five known methods of generating a reconstructed skull:

Manual manipulation methods: a 3D model of the skull is displayed on a monitor. This allows a surgeon, for example, to manually cut and reposition the bones in the 3D model to plan and generate a reconstructed model. However, manual bone repositioning is slow, time-consuming and subjective, because it is based on the surgeon's experience and judgement.

Symmetry-based methods: the non-defective or healthy part of the skull is reflected about a lateral plane of symmetry and the reflected parts are used as estimates for the normal shape of the defective parts. No reference model is required, but it is necessary to have non-defective parts of the skull from which to work. Where both sides of the skull are defective, these methods cannot be used.

Geometric reconstruction methods: 3D model registration involves the spatial transformation of a reference model so that it aligns with a target model. 3D model registration algorithms use either linear transformations (e.g. scaling, rotation, translation), or non-rigid (elastic) transformations. In known skull reconstruction methods, a reference model is non-rigidly registered to the healthy or non-defective parts of a defective model of the skull. The registered reference model is used to estimate the normal shapes of the defective skull parts. These methods do not require healthy parts that are symmetrical, but instead used a single reference model to generate the reconstructed model. The accuracy of these methods depends upon the similarity between the reference and the target model and the number of points used in the registration algorithm. Existing methods tend to use only a small number of points which are sparsely distributed, to minimise wrong correspondence. Wrong correspondence will result in wrong registration and thus wrong reconstruction.

Statistical reconstruction methods: these methods improve upon the limitations of the geometric reconstruction methods above by matching a statistical reference model to the healthy parts of a defective model, and using the matched statistical model to infer the normal shape of the defective parts of the defective model. However, such methods require a large number of training samples of normal skull models in order to construct the statistical model. The reconstruction accuracy depends on how well the statistical model captures the shape variation amongst normal skulls. If such normal shape variation is not adequately captured, the reconstruction will be inaccurate. Statistical reconstruction methods also rely on the correlation between healthy parts and defective parts.

Bone repositioning methods: these methods involve repositioning fractured bone fragments of a damaged skull into their correct positions, as described in WO2015142291A1, for example. Where fragments are missing or incomplete these methods cannot be applied. Moreover, they need to obtain the individual fractured bone fragments from the medical images. Manually obtaining the bone fragments can be very time-consuming.

Since all of the known methods of generating a reconstructed skull have drawbacks, it is desirable to provide an automatic, convenient and accurate method for reconstructing skulls from defective skulls, which may be due to fracture, damage, or congenital deformity.

As discussed above, both geometric and statistical methods of reconstruction involve non-rigid registration methods of 3D reference models. Existing non-rigid registration methods can be grouped into two broad categories: approximation and interpolation.

Approximating methods produce an approximating surface by fitting a reference surface to a target surface. The average distance between corresponding reference and target surfaces is minimised, subject to a smoothness constraint. The positional correspondence is regarded as a soft constraint, and registered surfaces have non-zero distance, or error, to the target surfaces.

On the other hand, interpolating methods produce an interpolating surface by fitting a reference surface so that it passes exactly through the corresponding target points. The positional correspondence is regarded as a hard constraint, and therefore the registered surfaces have zero error with respect to the corresponding target points. Interpolating methods are therefore generally more accurate than approximating methods for the registration of 3D objects with complex shapes.

There are three approaches for performing non-rigid registration with interpolating surfaces: free-form deformation (FFD), Laplacian deformation, and thin-plate spline (TPS).

Free-form deformation (FFD) uses the idea of enclosing a shape (mesh) within a 3D space. Deforming points on the 3D space warps or deforms the enclosed mesh. The 3D space is divided into parallelepiped regions whose vertices are control points. When the control points are moved to new positions, FFD transforms the control points according to Bernstein polynomial. FFD is primarily used for animation and tends not to be used for skull reconstruction, because the control points are not on the 3D model, making it difficult to determine the desired locations of the control points after free-form deformation.

Laplacian deformation deforms a reference model to fit target points by preserving the curvatures and surface normals of mesh vertices. It moves the surface points with correspondence to their desired positions exactly. Unlike TPS, the system of linear equations of Laplacian deformation captures only the mesh vertices without correspondence. The size of its data matrix is proportional to the square of the number of mesh vertices without correspondence. Therefore, the size of data matrix as well as the time and space complexity decreases with increasing correspondence. Laplacian deformation has not been used for skull reconstruction.

In contrast, thin-plate spline (TPS) is a popular method for registration and reconstruction of skulls. The process of TPS warping is analogous to the bending of a thin metal plate. TPS transforms the surface points of a mesh using a smooth mapping function that minimizes the bending energy. The mapping function consists of an affine transformation and a non-linear warping defined as the weighted sum of thin-plate spline functions. The parameters of the mapping function are solved through a system of linear equations that yields a unique solution. The size of the data matrix of this linear system is proportional to the square of the number of landmarks. Therefore, the time and space complexity of TPS increases rapidly with increasing number of corresponding landmarks.

Non-rigid registration interpolating methods can produce "flipped surfaces" when there are conflicts in the point correspondence that are regarded as hard constraints. Surface flipping refers to the local inversion of surface normals that causes surface self-intersection. Flipped surfaces cause severe distortion of surface shape, and are very difficult to remove. Existing TPS methods for registration and reconstruction of skulls use a sufficiently sparsely distributed set of corresponding points to avoid surface flipping. However, this sparse distribution reduces the accuracy of TPS registration and reconstruction results.

It is therefore desirable to provide an algorithm for non-rigid registration and reconstruction of complex 3D objects which has a higher degree of accuracy.

Computer-aided systems have been developed for the purpose of planning CMF and orthopaedic surgery. For example, systems are known that enable a surgeon to manually reposition the bones of the skull and then predict the facial appearance. However, manual repositioning of bones is time-consuming and inaccurate. Other known systems, such as iPlan® by BrainLab® and Stryker CMF® by Stryker, use the symmetry-based method described above to generate a reconstructed model that can be used to guide manual planning. However, these methods do not work for patients with bi-lateral fractures. Commercial software ProPlan CMF® by Materialise provides manual surgery planning service to surgeons. This shares the same limitations as manual reconstruction. Some known systems can generate surgery plans for mandible restoration using a fractured surface matching method, but this has limitations and is not reliable.

It is therefore desirable to provide a computer-aided system that conveniently and accurately generates a normal skull model from a patient's defective skull for CMF surgery planning, forensic investigation and anthropological study.

SUMMARY

According to a first aspect of the present invention, there is provided a method of obtaining a three-dimensional model of a reconstructed bone framework comprising using an iterative, surface interpolating algorithm. The method comprises the steps of: providing a target three-dimensional model of a bone framework to be reconstructed; providing a reference three-dimensional model of a bone framework; non-rigidly registering the reference model to the target model based upon positional constraints so as to produce a registered reference model; and setting an initial reconstructed model as the registered reference model. The method further comprises the steps of: iteratively conducting a first correspondence search to identify a first set of corresponding points on the reconstructed and target models, and, during each iteration non-rigidly registering the reconstructed model incrementally to the target model based upon the corresponding points; conducting a second correspondence search to identify a second set of corresponding points on the reconstructed and target models; removing crossings in the identified corresponding points and non-rigidly registering the reconstructed model to the target model based upon the remaining corresponding points so as to produce a registered, fully reconstructed model, which is the model of the reconstructed bone framework.

The first correspondence search may comprise determining that a distance between a pair of corresponding points in said first set is less than or equal to a first predetermined parameter, and that surface normals of the pair of corresponding points differ by no more than 10 degrees. The first predetermined parameter may be 0.5 mm.

The second correspondence search may comprise determining that a distance between a pair of corresponding points in said second set is less than or equal to a second predetermined parameter, and that a point on the target model is the nearest surface point to a corresponding point on the reconstructed model. The second predetermined parameter may be 3 mm.

Iteratively conducting a first correspondence search may further comprise selecting a sparse subset of the first set by applying a no-crossing condition. The sparse subset may contain approximately fewer than 10% of vertices on the target model.

Removing crossings may comprise obtaining a dense set of corresponding points. The dense set of corresponding points may contain approximately 80% of vertices on the target model.

Positional constraints may be obtained from manual marking of significant anatomical landmarks on the reference model and on the target model. The landmarks may be separated to ensure no crossing.

The target model may be a model of a defective skull and the reference model may be a model of a non-defective skull.

The non-rigid registration may be carried out using Laplacian deformation.

The method may further comprise providing the target model based upon images of the defective skull. An image intensity and/or a volume of interest of the images may be modified. The target model may be edited to remove non-relevant parts. The method may further comprise marking a defective part of the target model. At least one of the modifying, editing and marking may be carried out manually via a user interface of a software package.

The method may further comprise selecting the reference model from a plurality of reference models based upon a similarity between the target model and the reference model.

The bone framework may comprise a skull. The method may further comprise utilising a model of a reconstructed skull during craniomaxillofacial surgery.

The algorithm may be executed using a processor of a programmable computer.

According to a second aspect of the present invention, there is provided a computer program, comprising computer readable code which, when run on a computer processor, causes the processor to perform a method of obtaining a three-dimensional model of a reconstructed bone framework according to the first aspect above.

DETAILED DESCRIPTION

Described herein with reference to FIGS. 1 to 15 is a method of obtaining a three-dimensional model of a reconstructed bone framework using an iterative, surface interpolating algorithm. The bone framework in this illustrated example is a skull. In the following description, CMF surgery planning is used as an example. However, it will be appreciated that the method can be applied to skull and facial reconstruction for use in forensic investigation, anthropological study and the like. The method may also be applied to other large bone reconstruction.

The three-dimensional model obtained using the methods described herein can be used during surgery, for example, to improve the accuracy of the reconstructed physical bone framework.

The method of generating a 3D model of a reconstructed skull comprises the use of a non-rigid registration algorithm with flip-avoiding interpolating surface (FAIS). The algorithm non-rigidly registers a 3D reference model to a subject's (i.e. a patient's) target model. The non-rigidly registered 3D reference model, i.e. the model produced by the registration, can be regarded as a reconstructed, normal, non-defective model of the subject's target model. The subject's target model may be normal or defective. If defective, the subject's target model may contain fractured parts, abnormal parts or missing parts. The subject's target model may also contain outliers, such as x-ray metal artifacts.

The inputs of the algorithm include a normal, non-defective 3D reference model F, a possibly defective subject's target model T, and their correspondence C*.

Correspondence C* is a set of corresponding points (p, p'), where p is a landmark on the reference model F and p' is the corresponding landmark on the target model T. C* is obtained from manual marking of significant anatomical landmarks ($L_T$), placed on the reference model F and the target model T. The landmarks are adequately separated to ensure no crossing. The output of the algorithm is a reconstructed, normal model R of the target model T.

Figure 1:
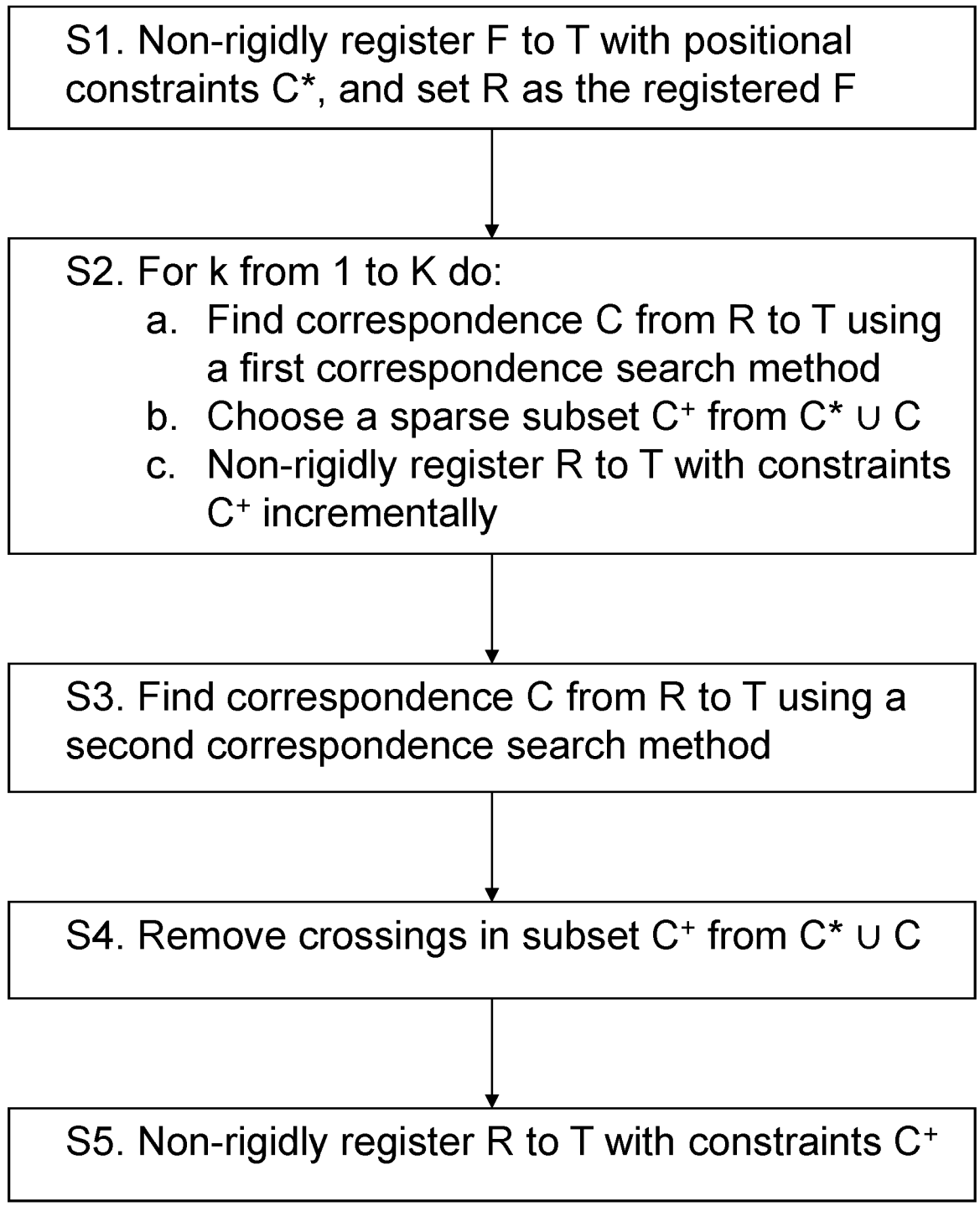
FIG. 1 is a flow chart of a method of obtaining a three-dimensional model of a reconstructed bone framework using an iterative, surface interpolating algorithm.

As illustrated in FIG. 1, the non-rigid registration algorithm FAIS is an iterative algorithm that comprises the following steps:

S1. Non-rigidly register F to T with positional constraints C*, and set R as the registered F.

S2. fork from 1 to K do:
   a. Find correspondence C from R (i.e. the registered F) to T using a first correspondence search method (as described below).
   b. Choose a sparse subset $C^+$ from $C^* \cup C$ (as described below).
   c. Non-rigidly register R to T with constraints $C^+$ incrementally.

S3. Find correspondence C from R to T using a second correspondence search method (as described below).

S4. Remove crossings in subset $C^+$ from $C^* \cup C$ (method 5).

S5. Non-rigidly register R to T with constraints C.

Steps 1, 2c and 5 outlined above perform non-rigid registration using Laplacian deformation, in contrast to known reconstructive methods, which use thin-plate spline. Therefore, the inventive method executes faster with an increasing number of correspondence points, whereas existing methods execute more slowly as the number of correspondence points increases.

Step 2a, Step 2b, Step 3 and Step 4 of the non-rigid registration, iterative algorithm FAIS outlined above will now be described in more detail.

S2a: Find Correspondence C from R to T Using a First Correspondence Search Method The first correspondence search method, applied in early iterations, searches for a corresponding mesh vertex p' on the target model T for each mesh vertex p on the registered reference model F (i.e. R) that satisfies the following conditions:

p' is near enough to p: $\|p-p'\| \leq D_1$, where $D_1$ is a constant parameter for the search range, and p' and p have similar surface normals that differ by no more than 10°.

$D_1$ can be set to 0.5 mm, for example. The surface normal is a vector which is perpendicular to the surface at a given point. The output of Step 2a is a set of correspondence vectors of the form (p, p').

S2b: Choose a Sparse Subset $C^+$ from $C^* \cup C$

This step comprises selecting a sparse subset $C^+$ of the correspondence set $C^* \cup C$ (where $C^*$ is the correspondence of F and T, and C is the correspondence of R and T), based on the simple no-crossing condition: there is no crossing if, for all pairs:

(p p') and (q,q') in $C^+$, $\|p-q\| > 2D$ where D is the upper bound of $\|p'-p\|$ in $C^* \cup C$ and where p and q are points on the surface of the reference model and p' and q' are points on the surface of the target model.

The sparse subset $C^+$ contains in the region of fewer than 10% of the vertices on the 3D mesh model (target model).

The selecting consists of the following sub-steps:

| S2b.1 | Set upper bound D to the largest $\|p' - p\|$ in $C^* \cup C$. |
| S2b.2 | Initialize $C^+ = C^*$. |
| S2b.3 | For each (p, p') ∈ C, if there is no (q, q') in C such that $\|p - q\| \leq 2D$, then add (q, q') to $C^+$. |

The crossing of correspondence vectors can lead to the local inversion of surface normals (surface flipping).

S3: Find Correspondence C from R to T Using a Second Correspondence Search Method The second correspondence search method, used in the final step of the iteration, searches for a corresponding point p' on the target T for each mesh vertex p on the reference F, such that:

p' is the nearest surface point of p on T, i.e., the nearest intersection of the surface normal at p with T, and $\|p-q\| \leq D2$, where D2 is a constant parameter D2 can be set to 3 mm, for example. The output is a set of correspondence vectors of the form (p, p').

S4. Remove Crossings in Subset $C^+$ from $C^* \cup C$

This step selects a dense subset $C^+$ of the correspondence set $C^* \cup C$ based on the general no-crossing condition: there is no crossing if:

for each $(p,p') \in C$, $\cos \theta(p;q) < \|p-q\|/(2D)$, $\forall q \in N(p) = \{q | \|p-q\| \leq 2D\}$ and $(q,q') \in C$ where D is the upper bound of $\|p'-p\|$ in $C^* \cup C$.

Whereas the sparse subset contains fewer than 10% of the vertices on the 3D mesh model, the dense subset $C^+$ contains approximately about 80% of the vertices on the 3D mesh model (target model).

The selecting consists of the following sub-steps:

| S4.1 | Set upper bound D to the largest $\|p' - p\|$ in $C^* \cup C$. |
| S4.2 | Initialize $C^+ = C^*$. |
| S4.3 | For each (p, p') ∈ C, if all q ∈ N(p) = {q | $\|p - q\| \leq 2D$}, such that (q, q') ∈ C satisfy $\cos \theta(\rho; q) < \|p - q\|/(2D)$, then add (p, p') to C+. |

As a result of the very dense correspondence set, the algorithm can achieve practically zero errors with respect to the non-defective parts of the target skull. The reconstructed shape of non-defective parts of the skull is therefore almost independent of the reference model used. Existing reconstructive methods use a sparse set of corresponding points to implicitly avoid surface flipping. The number of corresponding points used in existing methods is two orders of magnitude smaller than that of the inventive method, which is consequently far more accurate than existing methods using non-rigid registration.

Additionally, surface-flipping can be avoided by detecting and excluding conflicting hard constraints, rather than trying to remove surface flippings. Exclusion of conflicting hard constraints is affordable because of the very dense correspondence set selected.

Similarly, any outliers can be ignored.

As described above, in the early iterations, the algorithm registers the reference model to the target model in small increments to reduce the risks of wrong correspondence. Hence, the reference model (i.e. the initial reconstructed model or registered reference model) is deformed to fit the target model only very slightly in the early iterations. As the reference model registers more closely to the target model in subsequent iterations, the reference model is allowed to deform more since the risk of wrong correspondence is reduced. In the final iteration, the algorithm registers the reference model exactly to the target model to produce a fully reconstructed model of the target skull. Therefore, the inventive reconstructive method utilising the algorithm described in Steps 1 to 5 above is more robust than existing methods.

The above method of generating a 3D model of a reconstructed skull can be used in a planning procedure for CMF surgery, for example. Planning is carried out prior to surgery on an individual whose skull is to be reconstructed. A skull reconstruction tool run on a processor of a computer (e.g. server, personal computer, laptop, tablet or other processing device or devices) executes the method using steps comprised in the non-rigid registration algorithm with flip-avoiding interpolating surface (FAIS) described above.

The computer-aided CMF surgery planning procedure will now be described with reference to FIGS. 2 to 15. FIGS. 3 to 13 illustrate a user interface of a software package, developed for the purpose, which incorporates a skull segmentation tool and the skull reconstruction tool using the FAIS algorithm. The user interface is configured to receive user input, such as from a surgeon, and to display images of and/or one or more models of a skull or other large bone structure to the user. The software package is operated by the computer processor.

Figure 2:
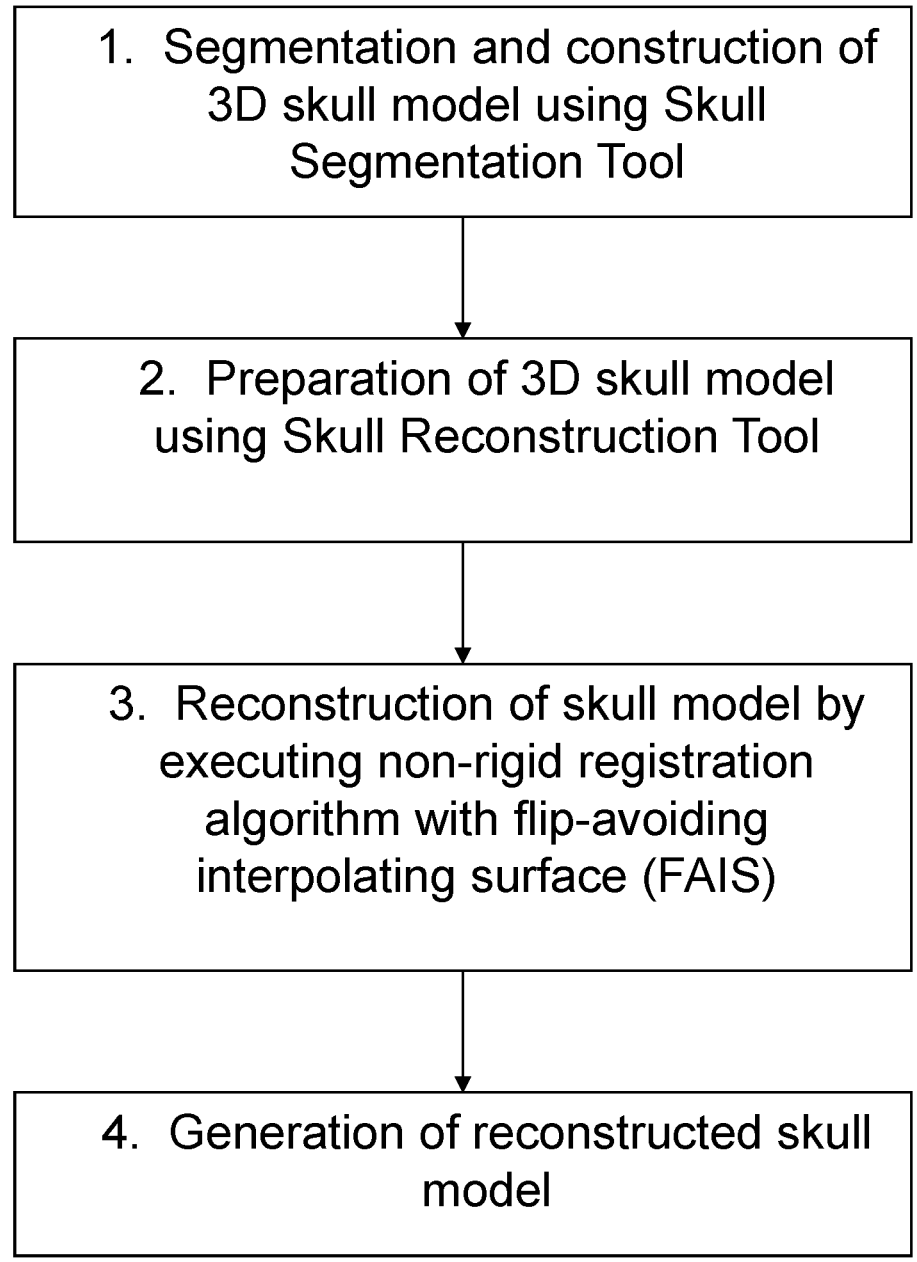
FIG. 2 is a flow chart of a method of computer-aided CMF surgery planning.

The surgery planning procedure has four main stages, as outlined in FIG. 2:

Stage 1: The surgeon (or other user) instructs a skull segmentation tool to segment and to construct a 3D target model of the patient's skull in its current condition from CT images in 5 steps (described in more detail below).

Stage 2: The surgeon uses a skull reconstruction tool to prepare the target skull for reconstruction in 7 steps (described in more detail below).

Stage 3: The surgeon instructs the skull reconstruction tool to execute the non-rigid registration algorithm with flip-avoiding interpolating surface (FAIS) to generate a reconstruction of the patient's normal skull model from his defective skull model. The user inputs captured in Step 2 are passed to the algorithm.

Stage 4: The surgeon instructs the skull reconstruction tool to export the reconstructed skull in STL (STereoLithography) format. The STL files can be imported into planning software, such as iPlan®.

These four stages will be described in more detail below.

Stage 1: Segmentation and Construction of 3D Skull Model

This stage of the CMF surgery planning procedure generates a 3D mesh model (target model) of a skull from a set of CT images, which are usually stored in DICOM (Digital Imaging and Communications in Medicine) format. In other words, a 3D model of the patient's skull in its present (possibly damaged) condition is obtained from scans of the patient's skull. Stage 1 comprises 5 steps:

S1.1: Import CT Images

Figure 3:
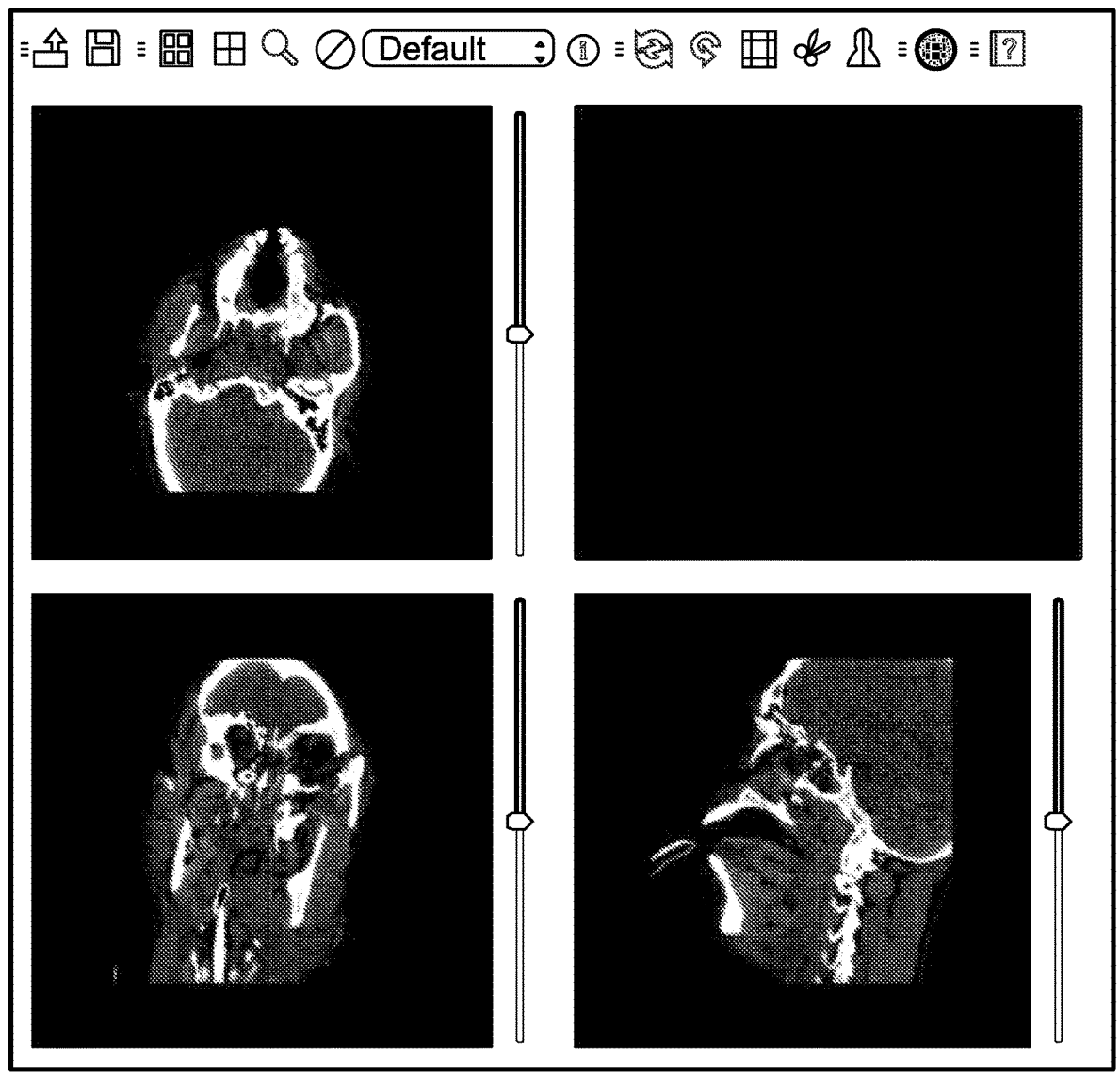
FIG. 3 illustrates a user interface of a skull segmentation tool in a software package for generation of a 3D model of a skull, using imported CT images comprising three standard anatomical views.

The import function of the skull segmentation tool is used to import CT images. As illustrated in FIG. 3, the imported CT images are displayed in three standard anatomical views that are familiar to the surgeon. These three views are the transverse (axial) view (illustrated in FIG. 3, top left), the coronal (frontal) view (illustrated in FIG. 3, bottom left) and the sagittal (medial) view (illustrated in FIG. 3, bottom right).

S1.2: Determine Volume of Interest (VOI)

Figure 4:
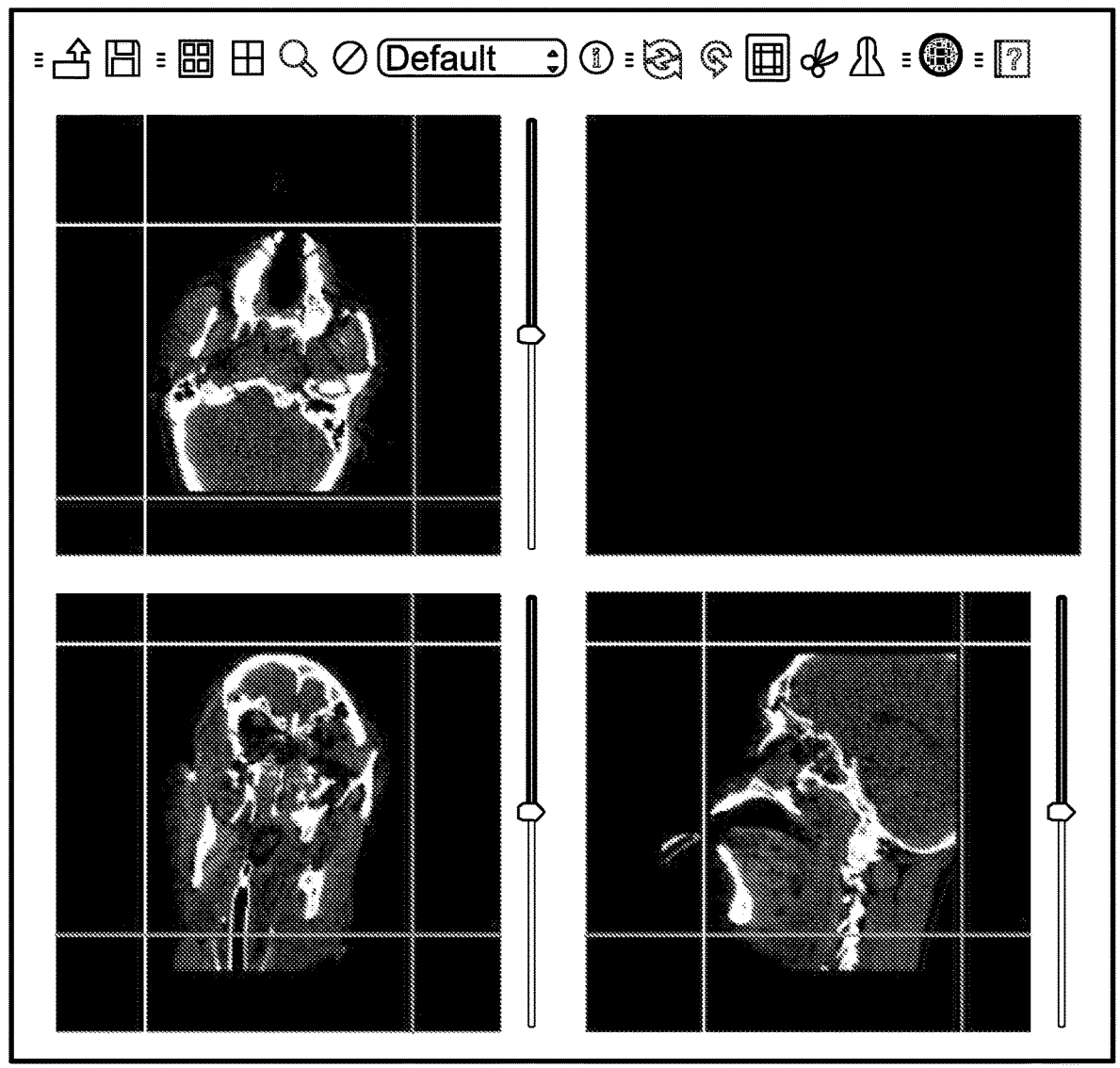
FIG. 4 illustrates the determination of a volume of interest for each of the three views of FIG. 3.
Figure 5:
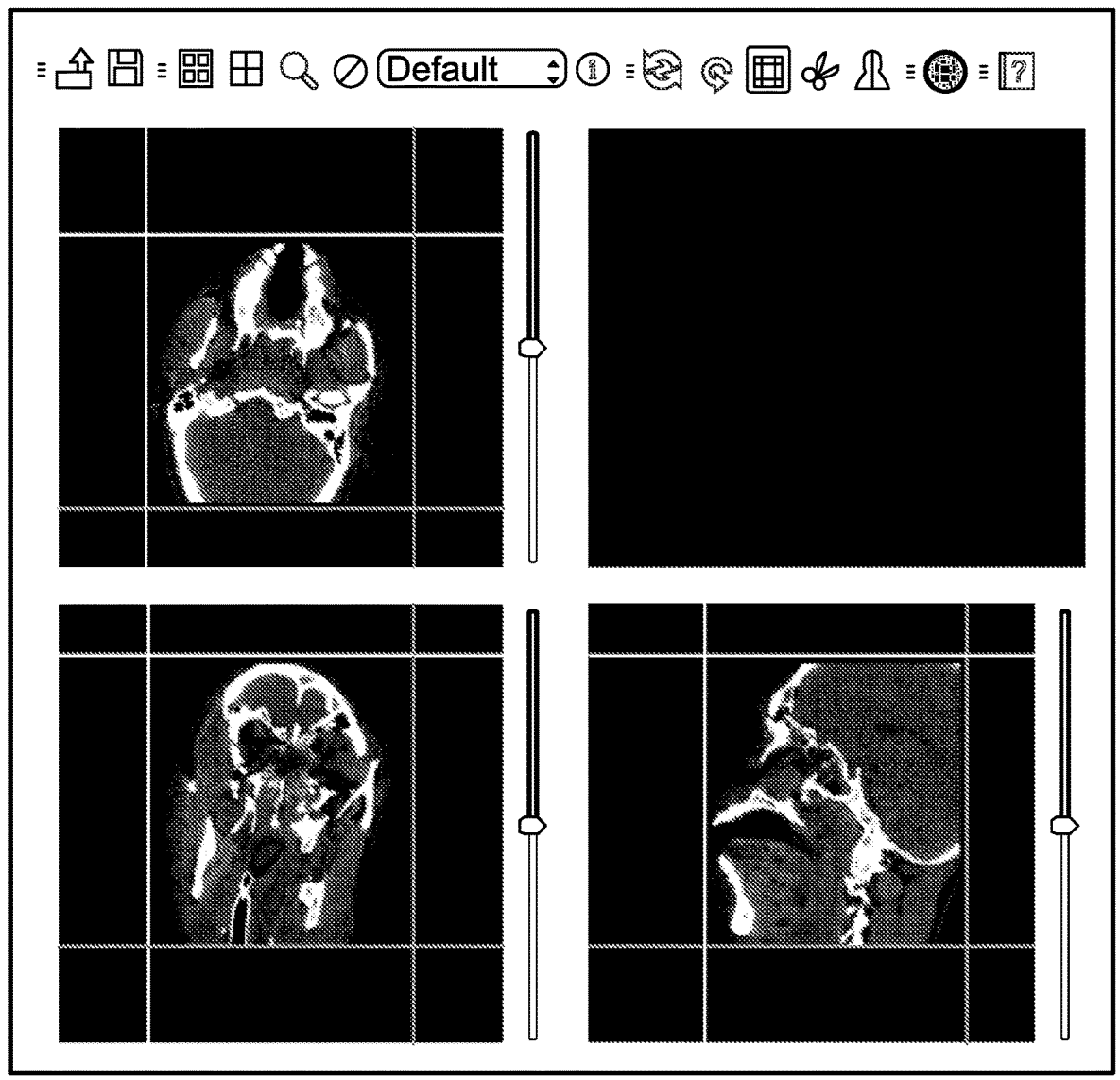
FIG. 5 illustrates the cropping of the three views of FIG. 3.

As illustrated in FIG. 4, the VOI lines in each of the three views are adjusted by the surgeon to define the VOI. As small a volume as possible that includes the skull, but excludes the neck and the spine, is formed. Then, as illustrated in FIG. 5, the VOI cropping tool is applied to remove the volumes outside the VOI using the software tool.

S1.3: Adjust Intensity Threshold

Figure 6:
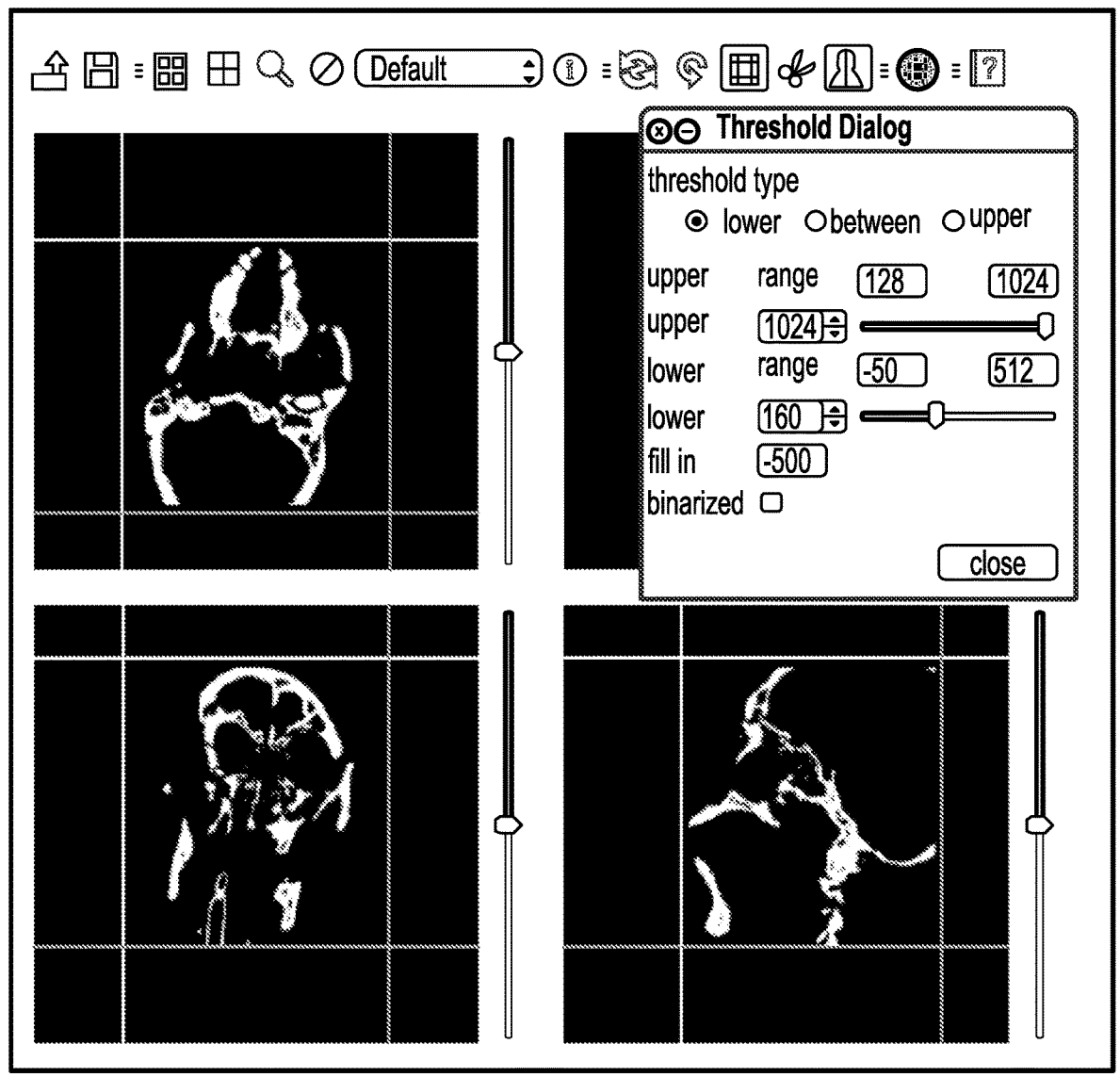
FIG. 6 illustrates modification of the image intensity threshold of the three views of FIG. 3, such that voxels with intensity no greater than the threshold are filtered out.

Skull segmentation is achieved by filtering out voxels (a value on a regular grid in 3D space) with intensity values no greater than a given threshold. This method is simple, efficient, and skull segmentation can be performed within a short amount of time. The thresholding function of the skull segmentation tool is used to adjust the intensity threshold so that most of the soft tissues disappear in the three views, as illustrated in FIG. 6. The intensity threshold should not be too low, otherwise the skull model to be constructed will contain too much soft tissue, which may affect the reconstruction accuracy. Also, the intensity threshold should not be too high, otherwise the skull model to be constructed will be incomplete.

S1.4: Generate Mesh Model

Figure 7:
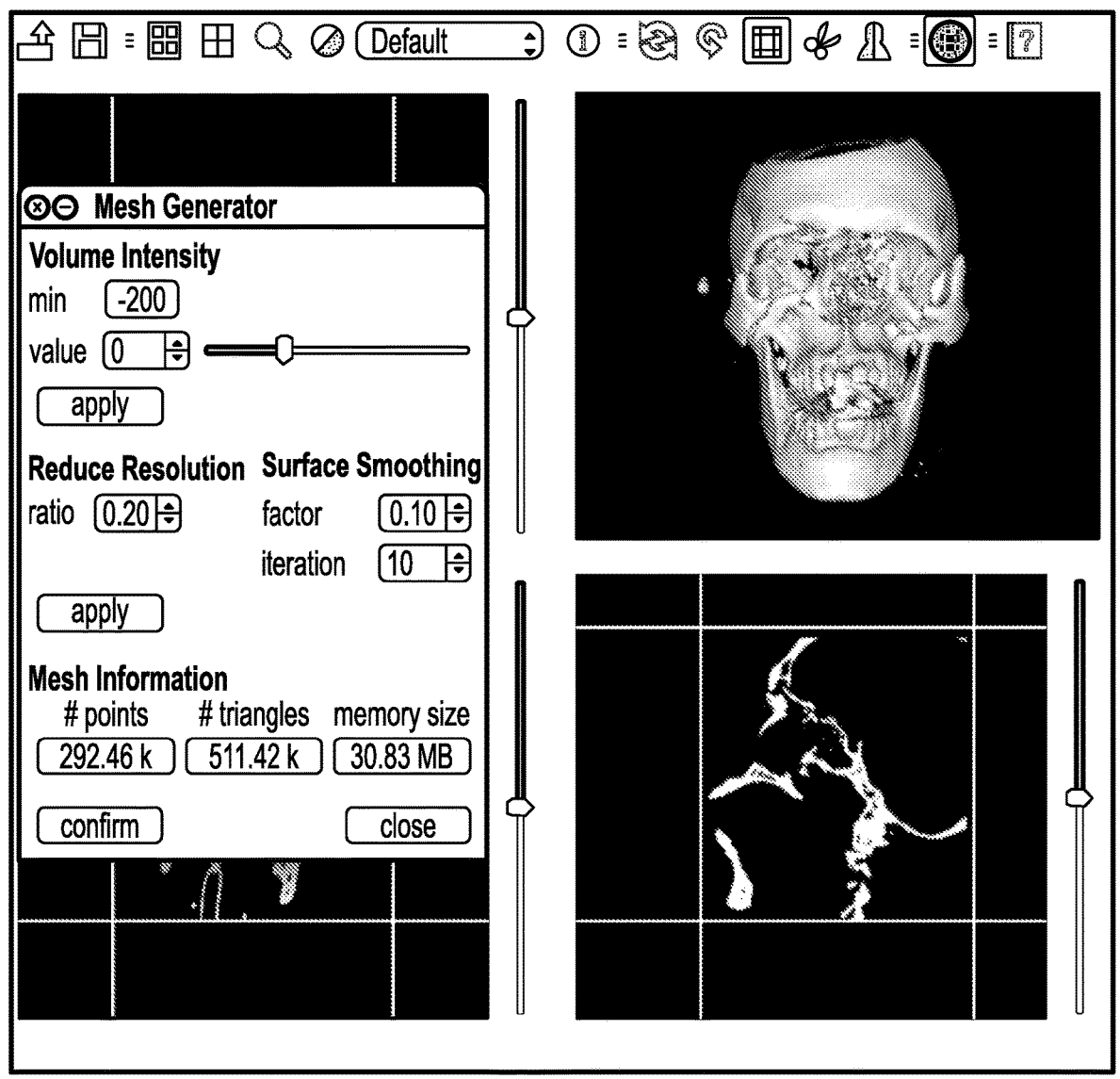
FIG. 7 illustrates the generation of a mesh model based upon the modified three views of FIG. 6.

The mesh generating function of the tool is used to generate a mesh model from the volume elements (voxels) with intensity values greater than the threshold, as illustrated in FIG. 7. Then, the mesh is simplified and smoothed, if necessary. The mesh model represents the 3D target model of the patient's skull in its current condition.

S1.5: Save Mesh Model

The export function of the tool is used to save the generated mesh in either PLY (Polygon File Format) or STL (STereoLithography) format. A mesh model stored in the PLY format is usually smaller in file size than the STL format. The STL format is used in computer-aided surgery planning systems such as iPlan®.

Thus, a 3D target model of the patient's skull in its current physical condition is produced using the skull segmentation tool in the steps outlined above. The model is initially produced from scan images and is modified in preparation for the next stage of the planning procedure. It will be appreciated that some of the steps in the first stage may be carried out in an alternative order, for example, the intensity volume may be adjusted prior to cropping.

Stage 2: Preparation of Skull Model

In this stage of the CMF surgery planning procedure, the surgeon uses the skull reconstruction tool to prepare the target (defective) skull model for reconstruction. The preparation comprises the removal of irrelevant parts and the marking of defective parts of the skull. The target model is also marked with a set of landmarks which correspond to points on a reference (non-defective) model. The landmarks indicate distinctive points on the skull surface.

Stage 2 of the planning procedure comprises 7 steps:

2.1: Import Mesh Model

Figure 8:
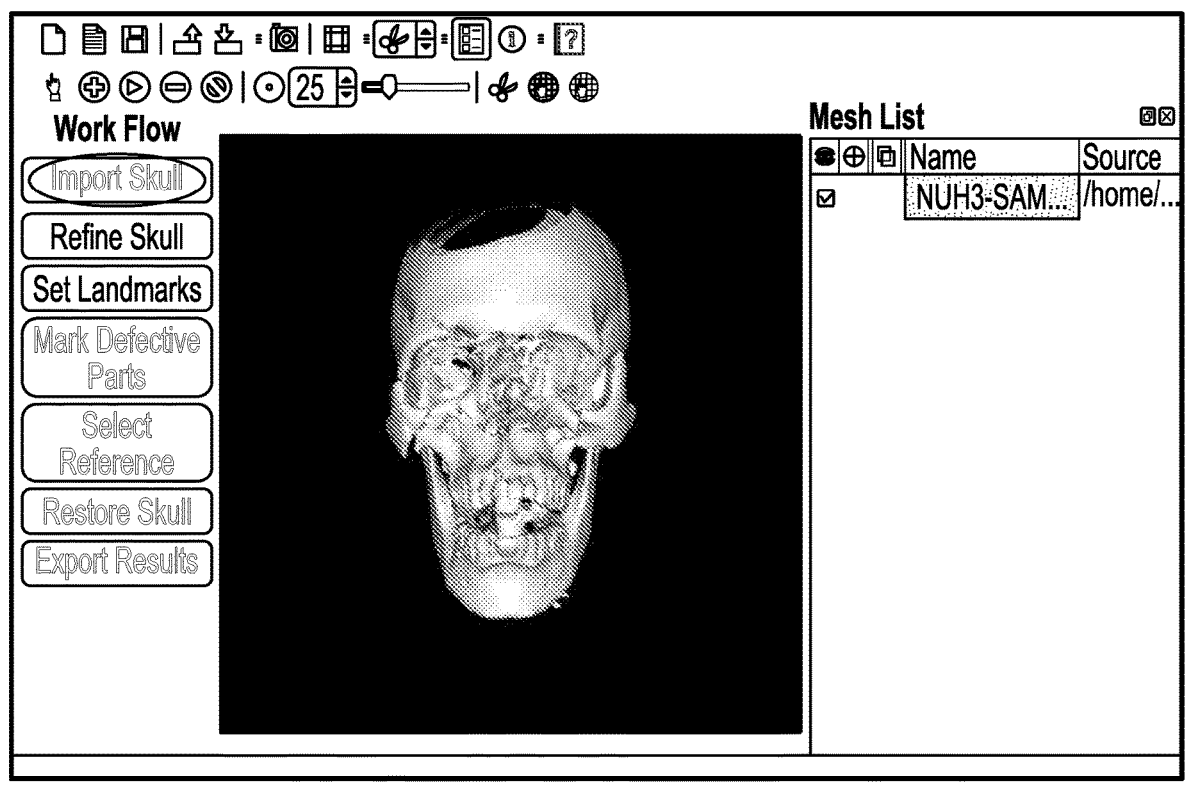
FIG. 8: illustrates a user interface of a skull reconstruction tool in a software package for generation of a 3D model of a skull, comprising the mesh model of FIG. 7.

As illustrated in FIG. 8, the import function of the skull reconstruction tool is used to import a mesh model into the skull reconstruction tool which forms a part of the software package. The imported mesh model, which comprises the target (defective) model T generated in Stage 1, is rendered in the central region of the reconstruction tool. Of course, the tool can also accept target models generated by other tools, not described here, as long as the file format is PLY or STL.

2.2: Remove Irrelevant Parts

Figure 9:
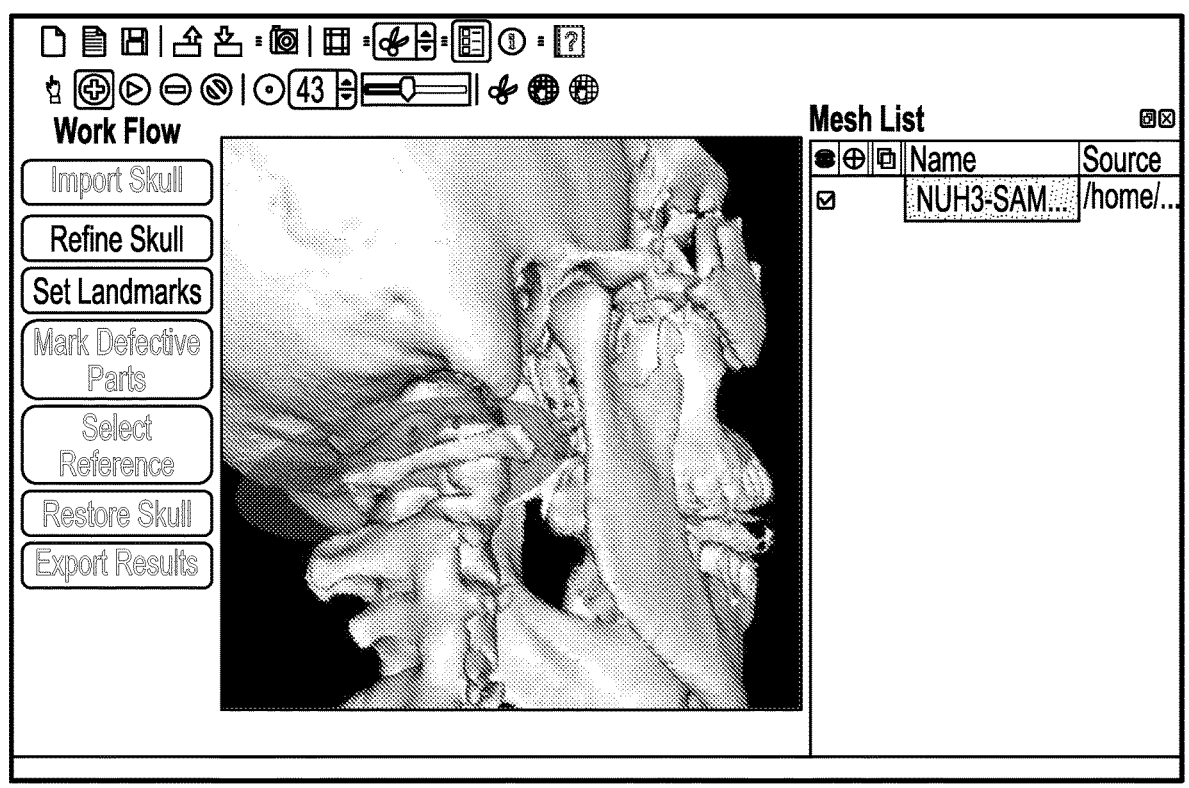
FIG. 9: illustrates the removal of irrelevant parts of the model of FIG. 7, wherein a cutting plane separates the spine from the main skull.
Figure 10:
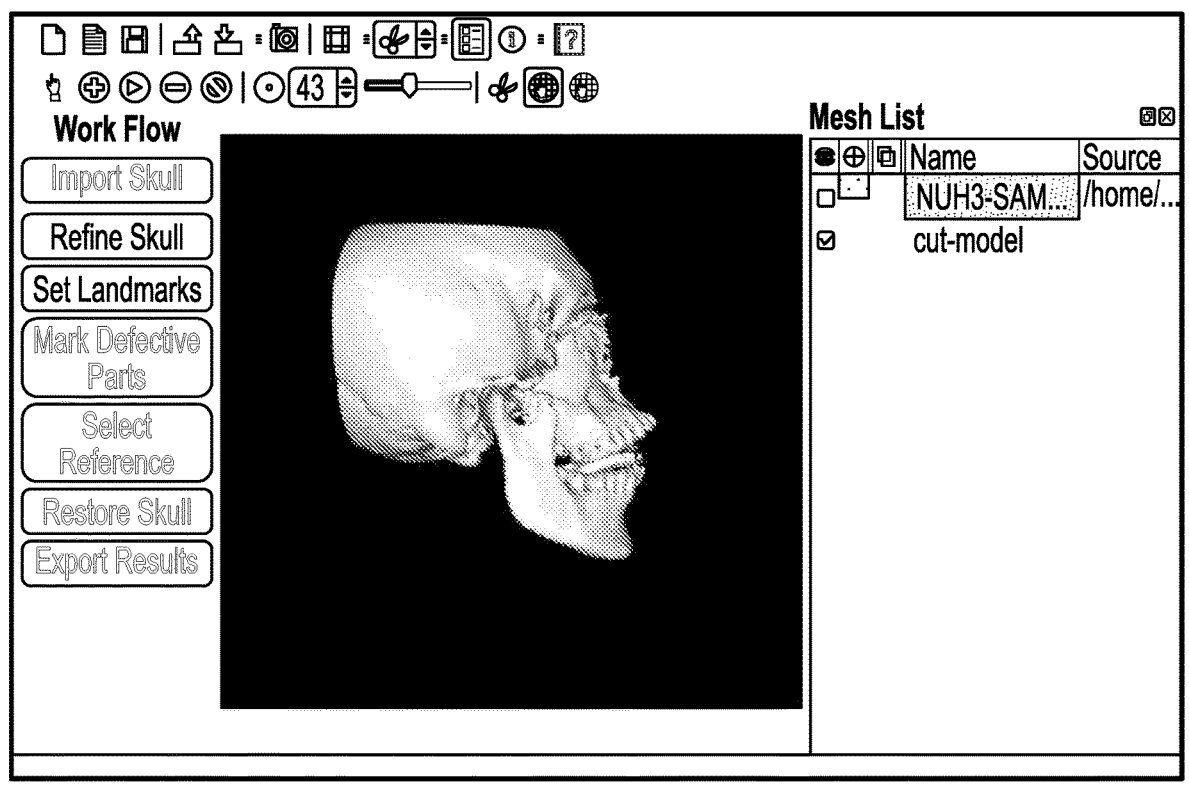
FIG. 10: illustrates the skull of the mesh model of FIG. 7 with the irrelevant parts removed.

The mesh model T may contain a spine, tubes and other components that are irrelevant to skull reconstruction and which may reduce the accuracy of the reconstruction if included. As shown in FIGS. 9 and 10, the cutting function of the skull reconstruction tool is used to remove these irrelevant parts. Cutting is achieved by fitting a cutting plane that separates the irrelevant part from the main skull. This step is different from the cropping performed in Stage 1; Stage 2.2 performs cutting of the 3D model constructed from the cropped and thresholded 3D volume image.

2.3: Place Landmarks

Figure 11A:
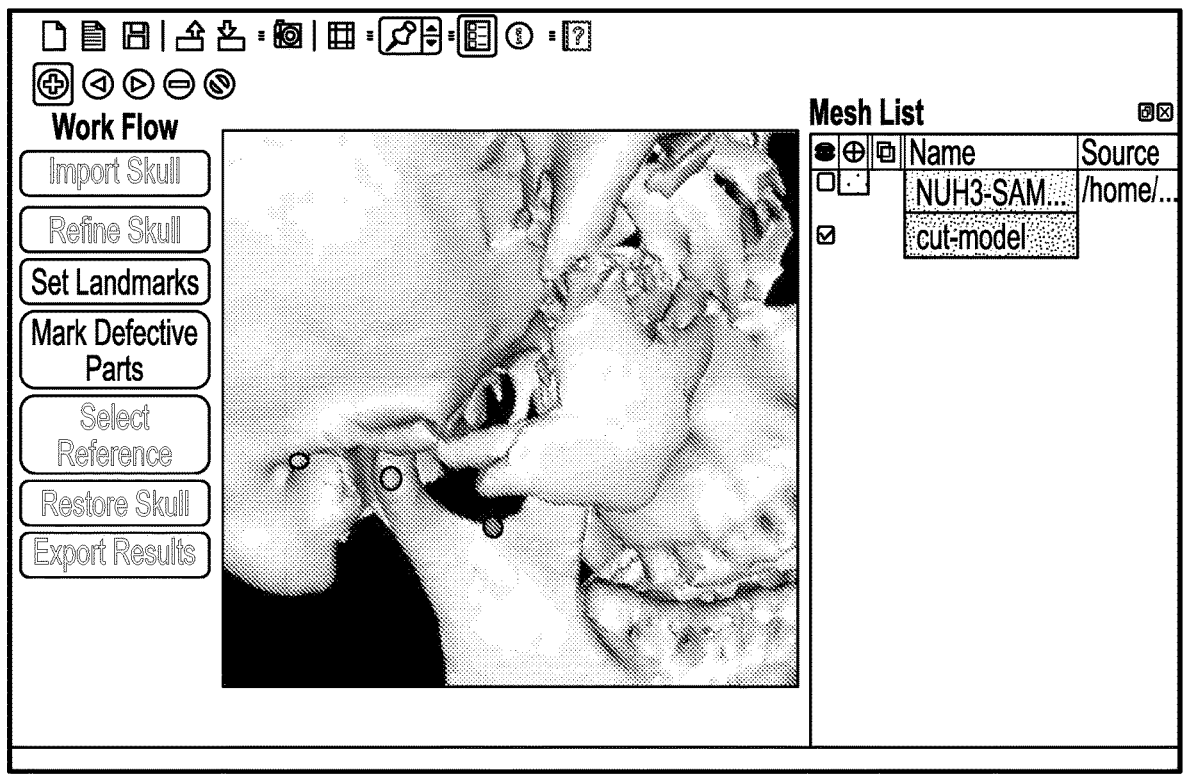
FIGS. 11a and 11b illustrate the placement of landmarks on the mesh model of FIG. 7, each of the landmarks corresponding to a landmark on a reference model.
Figure 11B:
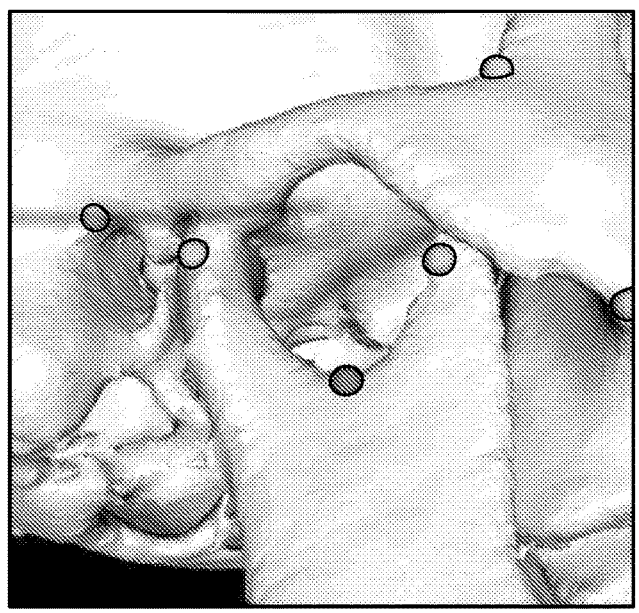

The landmarking function of the skull reconstruction tool is used to place landmarks $L_T$ on the target model T, as illustrated in FIGS. 11a and 11b. A small set of landmarks is used to ensure that the registration of the reference model to the target model is anatomically correct. Each of the target model landmarks $L_T$ corresponds to a landmark $L_F$ on a reference model F. The target model landmarks $L_T$ should not be placed on the defective parts of the target model T. Therefore, the target model landmark set $L_T$ is a subset of the reference landmark set $L_F$, as there will generally be landmarks on areas of the reference model F which cannot be placed on the corresponding areas of the target model T because of damage. However, the skull reconstruction tool does not require the presence of specific landmarks on the target model. For example, the tool can operate without the presence of mid-sagittal plane (MSP) or Frankfurt plane (FP) landmarks if required.

Target landmarks $L_T$ are placed by the user sufficiently far away from each other to avoid possible conflicts. The landmarks are placed according to the reference images provided by the software tool, which ensures that the landmarks are far enough from each other. These manually placed landmarks form the set C* in the algorithm of the present invention.

2.4: Mark Defective Parts

Figure 12:
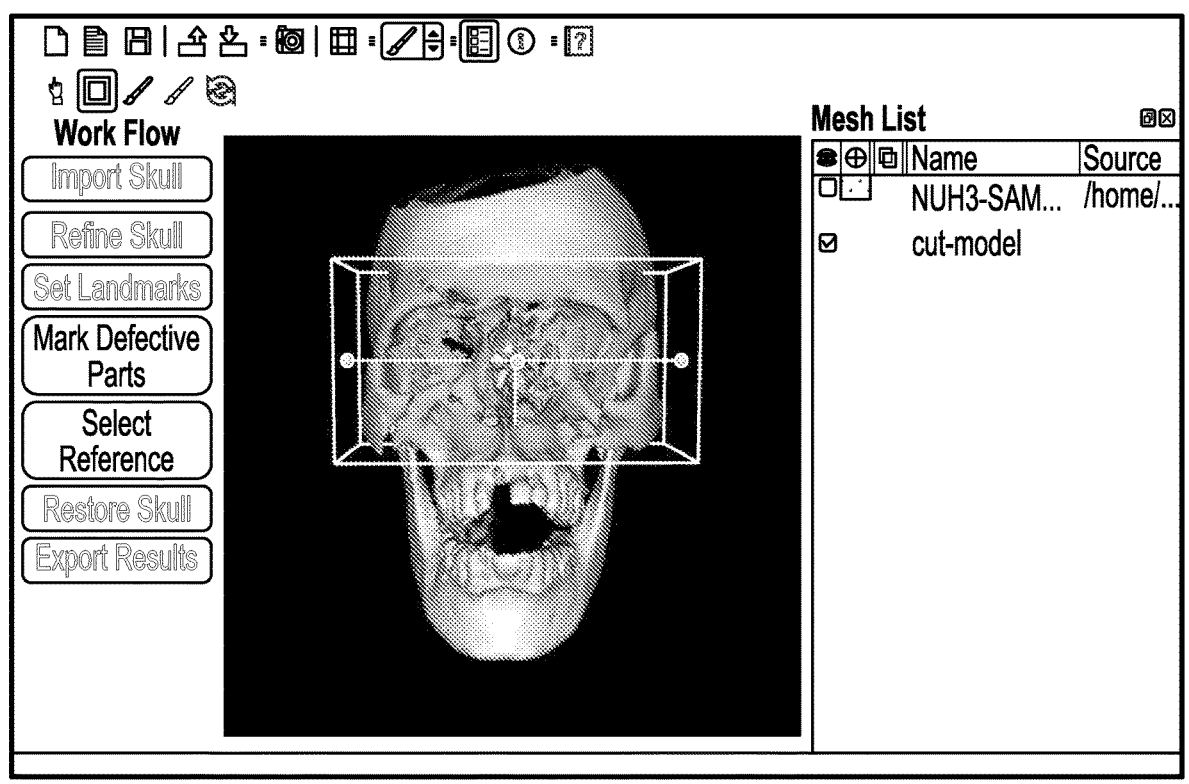
FIG. 12: illustrates the marking of a volume containing defective parts of the mesh model of FIG. 7.
Figure 13:
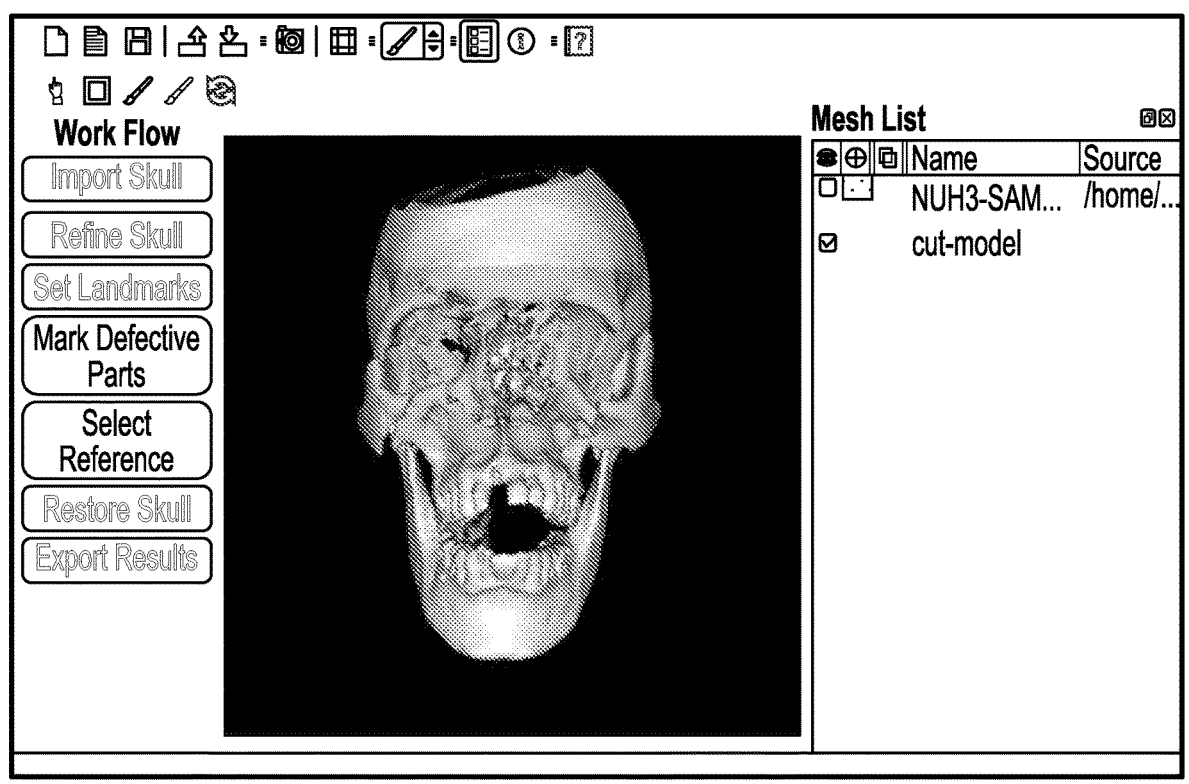
FIG. 13: illustrates the marking of defective parts of the mesh model of FIG. 7.

As illustrated in FIGS. 12 and 13, the painting function of the skull reconstruction tool is used to mark defective parts of the target model T i.e. parts of the patient's skull requiring reconstruction. The marking of defective parts is performed by locating a VOI that encloses the defective parts, as shown in FIG. 13.

2.5: Select Reference Model

The reference selection function of the skull reconstruction tool is used to select a reference model F. Multiple reference models are prepared as will be described below, and the one that is most similar to the target skull model T should be used by the non-rigid registration algorithm with flip-avoiding interpolating surface (FAIS). Each reference model is produced from a CT scan of a different person. These reference models are stored in the software package. The selection of the reference model that is most similar to the target skull model may be carried out manually by a human expert, or may be carried out automatically by artificial intelligence, or the like. The visual selection by a surgeon (or other human expert) of a suitable reference model tends to achieve the most accurate reconstruction in practice.

Figure 14:
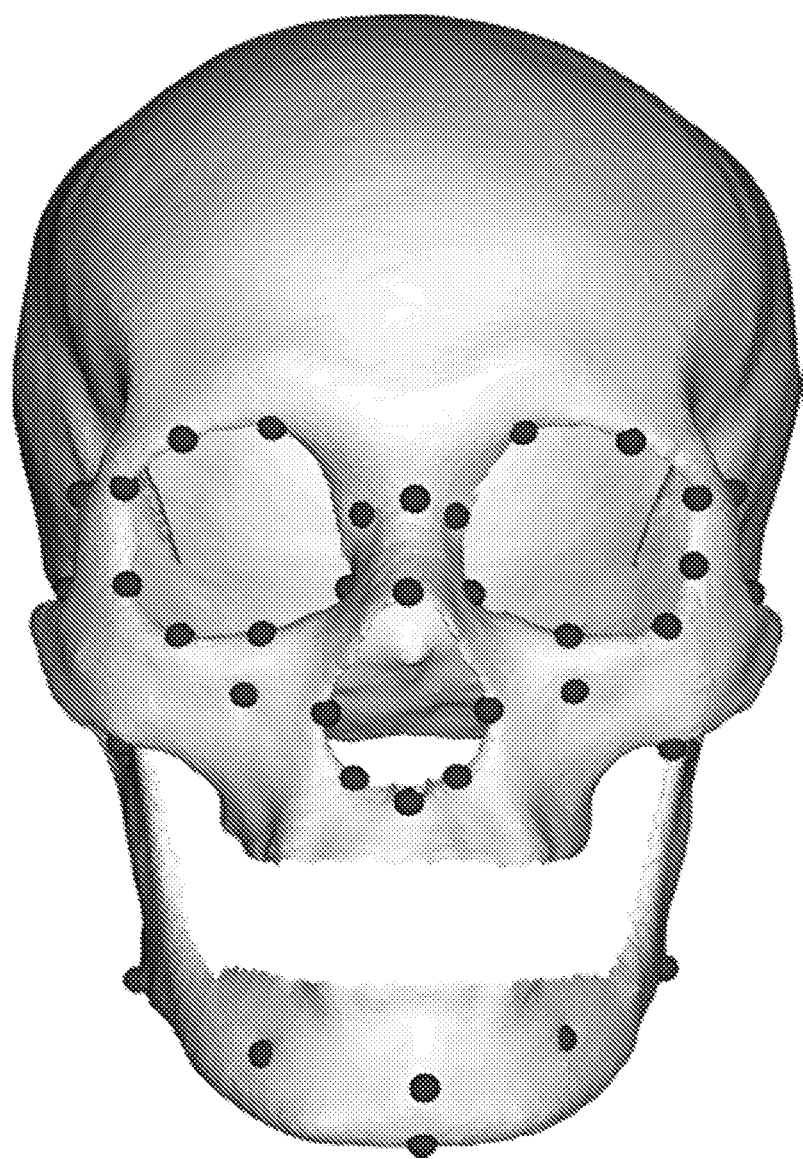
FIG. 14: illustrates landmarks placed on a reference model.

The preparation of a reference model comprises:

1. Segmenting and constructing a 3D skull model from CT images, as described in Stage 1 above.
2. Extracting the outer surface of the 3D skull model as the reference model.
3. Indicating, using a human expert, a set of anatomical landmarks on the reference model. The reference landmark set $L_F$ consists of 48 or more landmarks, as illustrated in FIG. 14. Eight of them define the mid-sagittal plane (MSP), and four of them define the Frankfurt plane (FP).

In an alternative embodiment, not shown here, the skull reconstruction tool may be configured to automatically identify the reference model that is most similar to the input target skull model.

2.6: Extraction of Outer Surface of Target Skull

The skull reconstruction tool is used to automatically extract the outer surface of the target skull model T.

2.7: Rigid Alignment of Reference Skull to Target Skull

The skull reconstruction tool is used to automatically align the reference model F to the target model T. The alignment is achieved by applying the best similarity transformation from the reference landmarks $L_F$ to the target landmarks $L_T$.

Figure 15A:
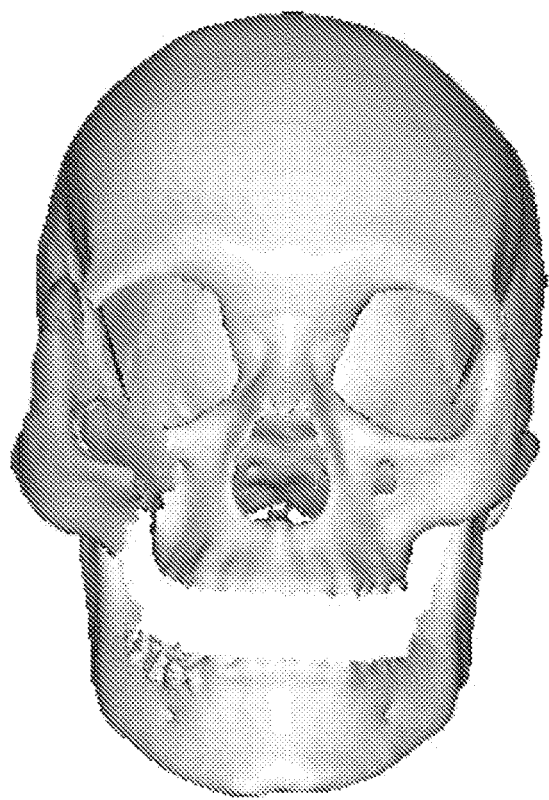
FIG. 15a: illustrates a target model with defective parts marked.
Figure 15B:
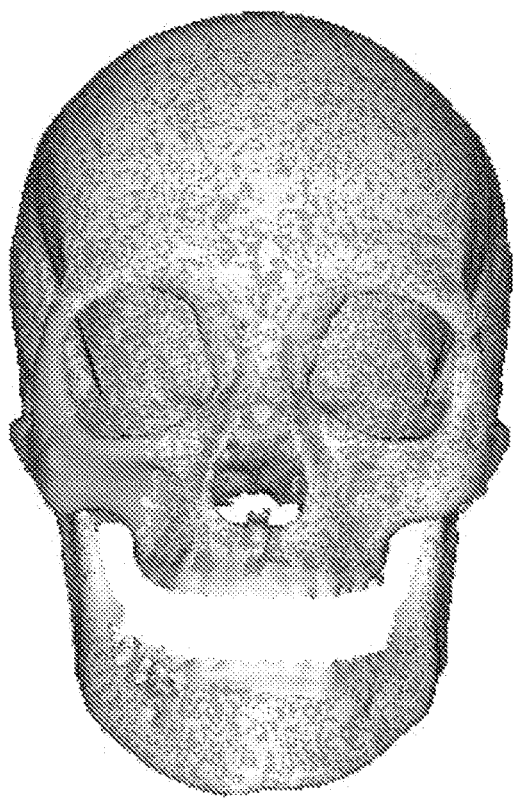
FIG. 15b: illustrates superimposition of the non-defective parts of the target model and the reconstruction of using the algorithm of the present invention.

Once Stages 1 and 2 of the CMF surgery planning procedure are complete, Stage 3 can be completed. Stage 3 requires the execution of the non-rigid registration algorithm with flip-avoiding interpolating surface (FAIS), as described above, using the inputs (i.e. the reference model F and reference model landmarks $L_F$, the target model T and target model landmarks $L_T$) generated in Stage 2. As illustrated in FIGS. 15a and 15b, the skull reconstruction using FAIS fits the non-defective parts of the target model very tightly, which is indicated by the alternating colour pattern on the superimposition of FIG. 15b.

In general, the method described herein is more intuitive and easier to use than known reconstructive methods, in that it requires fewer user inputs. This reduces the amount of time required to generate an accurate reconstructed model. The output of Stage 3 is reconstructed, normal model R of the target model T. The execution of the algorithm is carried out by the processor of the computer system.

Stage 4 of the CMF surgery planning procedure comprises using the skull reconstruction tool to export the reconstructed model R, usually in STL format. The STL file or files can be imported into a known planning software package, such as iPlan®, for use by the surgeon during CMF surgery and the like.

Thus, the inventive method described herein provides a computer-aided procedure using an automated algorithm for generating a reconstruction of a 3D skull from a subject's defective skull. The method may be used in craniomaxillofacial surgery planning, forensic investigation and anthropological study. Other uses of the method may be envisaged, such as training of CMF surgeons and modelling of implants for CMF surgery. The method may be incorporated into 3D modelling software and/or 3D segmentation tools, such as for 3D segmentation of volume images. The method is applicable to large bone structures or frameworks such as the skull or pelvis, where all surgical decisions are made according to the shape of the bone.

The method utilises an algorithm which applies an iterative surface interpolating method to register a reference model to a target model. It applies flip-avoiding techniques to detect and remove possible crossings of correspondence vectors, thus avoiding flipping of mesh surfaces after registration. With this flip-avoidance technique, the algorithm FAIS can perform registration using a very dense set of corresponding points. The algorithm's correspondence set is two orders of magnitude higher than those of existing methods. Therefore, it is far more accurate than existing methods in non-rigid registration. Moreover, it is also robust to outliers such as x-ray metal artifacts because the first correspondence search method uses distance and surface normals to look for corresponding points. Metal artifacts have very different surface normals compared to the surface normals of skull surfaces. Advantageously, the algorithm produces an exact match between the reconstructed model and non-defective parts of the target model i.e. parts of the skull which are undamaged or non-defective.

Further, the method can accurately generate normal reconstructed models, not only from fractured skulls, but also from incomplete and deformed ones. Thus it is applicable to a wider range of applications than many known reconstructive methods.

Additionally, the method can handle bilaterally defective skulls because of the nature of geometric reconstruction. This overcomes the limitation of symmetry-based methods which are applicable only to skulls with defects on one side. The method can therefore generated a complete reconstructed model rather than a partial model.

The software package is supported by a variety of operating systems, such as Windows, Linux, and OSX.

It will be appreciated by the person skilled in the art that various modifications may be made to the above described embodiment, without departing from the scope of the present invention.

For example, the method may utilise the above-mentioned algorithm without any user-specified landmark points. Alternatively or additionally, the method may comprise treating fractured or deformed parts of the target skull model as though they were missing parts. Alternatively or additionally, the method may comprise including lateral symmetry as an additional constraint in the algorithm. Thin-plate spine (TPS) instead of Laplacian deformation may be used.

Where Laplacian deformation is used, this may include constraints on the left-right symmetry of the target model based upon the shape of the reference model (i.e. registered reference model or reconstructed model).

The method may further be used to reconstruct a normal orbit from a subject's fractured orbit. As referred to herein, the term "skull" may include orbital bones of the eyes.

Step S2b and Step 4 of the above-mentioned algorithm FAIS can be implemented in various ways. One alternative is to initialize $C^+$ to be $C^* \cup C$ and remove the (p, p') in $C^+$ that conflict with the conditions.

In further embodiments, not described here, Step 1 of the algorithm described herein may be preceded by an initialisation step, which may comprise rigid registration.

The method may also be used to register a reference model to each of a set of training 3D models. The registered reference models have the shapes of the training models and identical mesh connectivity, which can be used directly as the training models for constructing active shape model.

Alternatively or additionally, fractional ICP (FICP) or plane-fitting registration may be used for initial rigid registration in the skull reconstruction tool.

Another modification is to use the method to register a reference face model to the facial landmark points above a skull model in order to reconstruct the face from the skull. This is useful for CMF surgery, forensic investigation and anthropological study.

As described herein, a "normal" skull refers to a "non-defective" skull. A non-defective skull may correspond to or approach the actual configuration or structure of an individual's skull, prior to an injury, accident or illness. Alternatively or additionally, a non-defective skull may correspond to or approach the configuration or structure that an individual's skull would have had, if the individual had not undergone abnormal development (e.g. a congenital deformity). A "reconstructed" skull therefore refers to the non-defective skull configuration or structure achieved following surgery, for example.

As described herein, a "target" skull refers to the actual physical skull which is to be reconstructed i.e. the subject's defective or damaged skull. A target model is therefore a model of the physical skull to be reconstructed.

The invention claimed is:

1. A method of obtaining a three-dimensional model of a reconstructed bone framework comprising using an iterative, surface interpolating algorithm, the method comprising the steps of:
   providing a target three-dimensional model of a bone framework to be reconstructed, the target model comprising a first three-dimensional mesh model;
   providing a reference three-dimensional model of a bone framework, the reference model comprising a second three-dimensional mesh model;
   non-rigidly registering the reference model to the target model based upon anatomical landmarks so as to produce a registered reference model;
   setting an initial reconstructed model as the registered reference model;
   iteratively conducting a first correspondence search using a first correspondence search method to identify a first set of corresponding mesh vertices on the reconstructed and target models, and during each iteration non-rigidly registering the reconstructed model incrementally to the target model based upon the corresponding mesh vertices;
   conducting a second correspondence search using a second correspondence search method to identify a second set of corresponding mesh vertices on the reconstructed and target models; and
   removing crossings in the identified second set of corresponding mesh vertices and non-rigidly registering the reconstructed model to the target model based upon the remaining corresponding mesh vertices so as to produce a registered, fully reconstructed model, which is the model of the reconstructed bone framework, wherein the first correspondence search method and the second correspondence search method differ such that a density of the remaining corresponding mesh vertices is greater than a density of the first set of corresponding mesh vertices from each iteration.

2. A method as claimed in claim 1, wherein the first correspondence search comprises determining that a distance between a pair of corresponding mesh vertices in said first set is less than or equal to a first predetermined parameter, and that surface normals of the pair of corresponding mesh vertices differ by no more than 10 degrees.

3. A method as claimed in claim 2, wherein the first predetermined parameter is 0.5 mm.

4. A method as claimed in claim 1, wherein the second correspondence search comprises determining that a distance between a pair of corresponding mesh vertices in said second set is less than or equal to a second predetermined parameter, and that a mesh vertex on the target model is the nearest surface mesh vertex to a corresponding mesh vertex on the reconstructed model.

5. A method as claimed in claim 4, wherein the second predetermined parameter is 3 mm.

6. A method as claimed in claim 1, wherein iteratively conducting a first correspondence search further comprises selecting a sparse subset of the first set by applying a no-crossing condition.

7. A method as claimed in claim 6, wherein the sparse subset contains approximately fewer than 10% of vertices on the target model.

8. A method as claimed in claim 1, wherein removing crossings further comprises obtaining a dense set of corresponding mesh vertices.

9. A method as claimed in claim 8, wherein the dense set of corresponding mesh vertices contains approximately 80% of vertices on the target model.

10. A method as claimed in claim 1, wherein anatomical landmarks are obtained from manual marking of significant anatomical landmarks on the reference model and on the target model.

11. A method as claimed in claim 10, wherein the landmarks are separated to ensure no crossing.

12. A method as claimed in claim 1, wherein the target model is a model of a defective skull and the reference model is a model of a non-defective skull.

13. A method as claimed in claim 1, wherein each of the non-rigid registrations is carried out using Laplacian deformation.

14. A method as claimed in claim 12, further comprising providing the target model based upon images of the defective skull.

15. A method as claimed in claim 14, wherein an image intensity and/or a volume of interest of the images is modified.

16. A method as claimed in claim 14, further comprising editing the target model to remove non-relevant parts.

17. A method as claimed in claim 14, further comprising marking a defective part of the target model.

18. A method as claimed in claim 14, wherein at least one of the modifying, editing and marking is carried out manually via a user interface of a software package.

19. A method as claimed in claim 1, further comprising selecting the reference model from a plurality of reference models based upon a similarity between the target model and the reference model.

20. A method as claimed in claim 1, wherein the bone framework comprises a skull.

* * * * *